(12) United States Patent
El-Khoury

(10) Patent No.: US 8,587,546 B1
(45) Date of Patent: Nov. 19, 2013

(54) MUTLI-PANEL DISPLAY SYSTEM AND METHOD FOR OPERATING THE SAME

(75) Inventor: Hassane El-Khoury, Pleasanton, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 206 days.

(21) Appl. No.: 13/233,600

(22) Filed: Sep. 15, 2011

Related U.S. Application Data

(60) Provisional application No. 61/391,599, filed on Oct. 9, 2010.

(51) Int. Cl.
*G06F 3/041* (2006.01)
(52) U.S. Cl.
USPC ............................................. 345/173; 725/75

(58) Field of Classification Search
None
See application file for complete search history.

(56) References Cited

U.S. PATENT DOCUMENTS

| | | | |
|---|---|---|---|
| 2005/0138662 A1* | 6/2005 | Seto | 725/75 |
| 2006/0155429 A1* | 7/2006 | Boone et al. | 701/1 |
| 2010/0188352 A1* | 7/2010 | Ikeda | 345/173 |
| 2011/0169755 A1* | 7/2011 | Murphy et al. | 345/173 |

* cited by examiner

*Primary Examiner* — Jason Olson

(57) ABSTRACT

Embodiments described herein provide multi-panel display systems and methods for operating the same. Content is generated on a first display device based on first user input received through a user interface device coupled to the first display device. Second user input is received on the user interface device. The generated content is displayed on a second display device in response to the receiving of the second user input on the user interface device.

13 Claims, 7 Drawing Sheets

MUTLI-PANEL DISPLAY SYSTEM AND METHOD FOR OPERATING THE SAME

RELATED APPLICATION

This application claims the priority benefits of U.S. Provisional Application No. 61/391,599, filed Oct. 9, 2010, which is incorporated in its entirety by reference herein.

TECHNICAL FIELD

This disclosure relates to the field of display systems and, in particular, to multi-panel display system.

BACKGROUND

In recent years, display systems, such as those using liquid crystal display (LCD) panels, have become increasing integrated in various industries and product lines.

One example is the automotive industry. It is very common for new automobiles to be equipped with one or more display panels so that the driver and/or the passengers have access to various features while in the vehicle. Examples of such features include a Global Positioning System (GPS), entertainment (e.g., movies, games, etc.), and even access to the Internet.

However, often the display systems are configured such that they may not allow certain features to be used while the vehicle is in motion, as there is a concern that the driver may become distracted by either preparing and/or viewing the content.

BRIEF DESCRIPTION OF THE DRAWINGS

The present disclosure is illustrated by way of example, and not by way of limitation, in the figures of the accompanying drawings.

DETAILED DESCRIPTION

Figure 1:
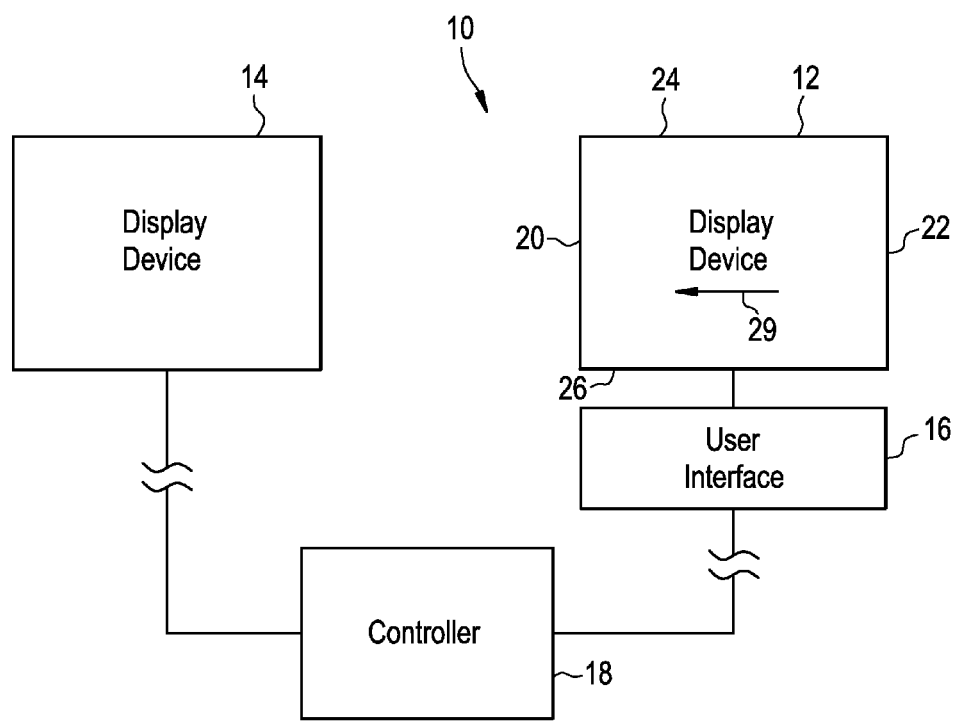
FIG. 1 is a block diagram illustrating an embodiment of a multi-panel display system.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

In the following detailed description, for purposes of explanation, numerous specific details are set forth in order to provide a thorough understanding of the subject matter of the present application. It will be evident, however, to one skilled in the art that the disclosed embodiments, the claimed subject matter, and their equivalents may be practiced without these specific details.

The detailed description includes references to the accompanying drawings, which form a part of the detailed description. The drawings show illustrations in accordance with example embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Embodiments described herein provide a system and method for transferring content from one display device to another display device based on user input received by a user interface device associated with the first display device. In one embodiment, the first display device is a touch screen panel, and the user interface device includes a sensor array coupled to the first display device.

In one embodiment, a vehicular multi-panel display system is provided. The vehicular multi-panel display system includes a first display device, a user interface device in operable communication with the first display device and configured to receive user input, a second display device in operable communication with the first display device, and at least one processing device in operable communication with the first display device, the user interface device, and the second display device. The at least one processing device is configured to detect first user input received by the user interface device, generate content on the first display device in response to the detecting of the first user input, detect second user input received by the user interface device, and display the generated content on the second display device in response to the detecting of the second user input.

In another embodiment, a computing network is provided. The computing network comprises a first display device and a second display device. A user input device is coupled to the first display device. A first controller is in operable communication with the first display device and the user input device. The first controller is configured to generate content on the first display device and transmit a signal representative of the content in response to user input received by the user input device. A second controller is in operable communication with the second display device and the first controller. The second controller is configured to receive the signal representative of the content and generate the content on the second display device in response thereto.

In a further embodiment, a method for operating a vehicular multi-panel display system is provided. Content is generated on a first display device in a vehicular passenger compartment based on first user input received through a user interface device coupled to the first display device. Second user input is received on the user interface device. The generated content is displayed on a second display device in the vehicular passenger compartment in response to the receiving of the second user input on the user interface device.

FIG. 1 is a block diagram illustrating one embodiment of a multi-panel display system 10 according to one embodiment. The display system 10 includes a first display device (or screen or panel) 12, a second display device 14, a user interface device 16, and a controller (or control system) 18.

In one embodiment, the first and second display devices 12 and 14 are liquid crystal display (LCD) panels, as is commonly understood, in operable communication through the user interface device 16 and the controller 18. Although not shown, each of the display devices 12 and 14 may include a lower substrate, an upper substrate, a liquid crystal layer, and polarizers. The lower substrate may be made of glass and have a plurality of transistors formed thereon that divide the panel into a plurality of pixels. The liquid crystal layer may be positioned between the lower substrate and the upper substrate and include a liquid crystal material suitable for use in a LCD display. However, in other embodiments, different types of display devices may be used, such as organic light emitting diode (OLED) displays, surface-emissive displays (SED), nanocrystal displays, and other displays which may utilize a touch screen or touch interface.

Although not shown in FIG. 1, the first and second display devices 12 and 14 may be connected to a frame and positioned as indicated in FIG. 1. More particularly, the first display device may have first and second lateral sides (or edges 20 and 22), an upper side 24, and a lower side 26, and the second display device 14 is positioned on (or to) the first lateral side 20 of the first display device 12.

Generally, the user interface device, or user input device, 16 is any device or component that is suitable to receive input from a user to, for example, control content or information that is displayed on the first display device 12 (and/or the second display device 14, as described below). In one embodiment, the user interface device 16 includes an array of sensors (e.g., capacitive or resistive) connected to and/or overlaying the first display device 12. In a preferred embodiment, the sensors are capacitive sensors arranged in a row and column configuration that utilize a high impedance capacitance substrate.

The sensors may be used to detect the position (and/or movement and/or contact) of an object (e.g., a finger of a user or a stylus) with respect to the first display device 12 and generate a signal representative of the position to a computing device (e.g., the controller 18). As such, the first display device 12 and the user interface device 16 may jointly form a touch screen display device (or panel), as is commonly understood, with the array of sensors overlapping the first display device 12. Although only one user interface device 16 is shown in the depicted embodiment, additional user interface devices may be provided for each of the display devices in the display system 10.

In another embodiment, the user interface device 16 is a panel having one or more buttons or switches thereon. In such an embodiment, the first display device 12 may operate solely as a mechanism to render images, without touch screen capability. In yet another embodiment, the user interface device 16 comprises one or more component (e.g., accelerometers, gyroscopes, etc.) configured to detect motion of the user interface device 16 itself and/or the first display device 12. In such an embodiment, the user interface device 16 may be physically coupled to the first display device 12 (e.g., such as in a handheld device).

Still referring to FIG. 1, the controller 18 is in operable communication with the first and second display devices 12 and 14 and the user interface device 16. The controller 18 may be a computing device that controls the operation of the first and second display devices 12 and 14 based on, for example, user input received by the user interface device 16. The controller 18 may include or ore more of any numerous known general-purpose microprocessors or application specific processors that operate in response to program instructions, as described with respect to FIG. 7 below.

It should be understood that although a single controller 18 is shown, in some embodiments, each display device 12 and 14 may have a separate, dedicated controller, along with a separate memory associated with that controller. In such an embodiment, the separate controllers may be in operable communication through any suitable manner, including a wireless connection. As such, the system shown in FIG. 1 may be a computer (or computing) network, with each of the display devices 12 and 14 being associated with separate computing systems or devices. In such an embodiment, each of the display devices 12 and 14 (and/or associated controllers) may be implemented within various types of devices, which may be portable or handheld devices. Examples of such devices include, but are not limited to, cell phones, personal data assistants (PDA), Global Positioning System (GPS) modules or devices, tablet computers, digital media players, laptop personal computers (PC), televisions, handheld game systems, game console displays, public information system displays, and electronic advertising billboards.

The controller 18 may be configured to provide specific functionality to the user through the first and second display devices 12 and 14, such as global positioning system (GPS) navigation, internet browsing, and entertainment (e.g., games, movies, etc.).

In one embodiment, the touch screen display and/or the controller 18 is provided using a Cypress TrueTouch™ Controller offered by Cypress Semiconductor Corporation (San Jose, Calif.), which incorporates a Programmable System-on-Chip (PSoC®), such as that used in the PSoC® family of products, also offered by Cypress Semiconductor Corporation (San Jose, Calif.), an example of which is described in greater detail below.

Still referring to FIG. 1, in operation, a user enters user input (i.e., first user input) into the user interface device 16. Upon receiving the appropriate signal from the user interface device 16, the controller 18 causes content or information (e.g., an image, text, etc.) to be displayed on the first display device 12. Additional user input may be supplied by the user to modify the content (e.g., change an image) if so desired.

If the user wants the content to be displayed on the second display device 14, the user enters predetermined (e.g., as stored in the controller 18) user input into the user interface device 16. In the embodiment in which the first display device 12 and the user interface device 16 jointly form a touch screen panel, the user input may be a gesture performed on (or in proximity to) the first display device 12 (and/or the user interface device 16).

For example, in the arrangement shown in FIG. 1, in which the first and second display devices 12 and 14 are horizontally aligned, the user input may include a gesture, such as a "flick" or a "swipe," across the first display device 12, which extends in a horizontal direction (e.g., substantially between the first and second lateral sides 20 and 22). In one particular example, the user input is a flick in a direction indicated by arrow 29 (i.e., substantially towards the first lateral side 20 of the first display device 12), which corresponds to the position of the second display device 14 relative to the first display device 12.

However, it should be understood that other types of user input may be used, depending on the type of user interface device 16, examples of which are provided above. In an embodiment in which the user interface 16 is configured to detect motion of the user interface device 16, the user input may include a motion or gesture performed with the user interface device 16 (e.g., when used with a handheld device), such as a waving motion towards the second display device 14. It should also be understood that the user input may include a series of separate user input actions. For example, a first gesture performed on the first display device 12 may cause a virtual button or menu to appear on the first display device 12. The user may then use the virtual button or menu (i.e., a virtual user input device) to send the content on the display device as described below.

In response, the controller 18 causes the content displayed on the first display device 12 to be displayed on (or sent to) the second display device 14. In this manner, the user is able to generate or modify content on the first display device 12 and quickly and easily send it to the second display device 14.

In one embodiment, after the content is sent to the second display device 14, the content no longer appears on the first display device 12. Additionally, the gesture performed on the first display device 12 may cause the content to appear to "move off" or "slide off" the first display device in the direction indicated by the gesture (e.g., towards the second display device). Likewise, the content may appear to "move on" or "slide onto" the second display device 14 from a direction corresponding to the position of the second display device 14 relative to the first display device 14 (e.g., from the right, as shown in FIG. 1).

Figure 2:
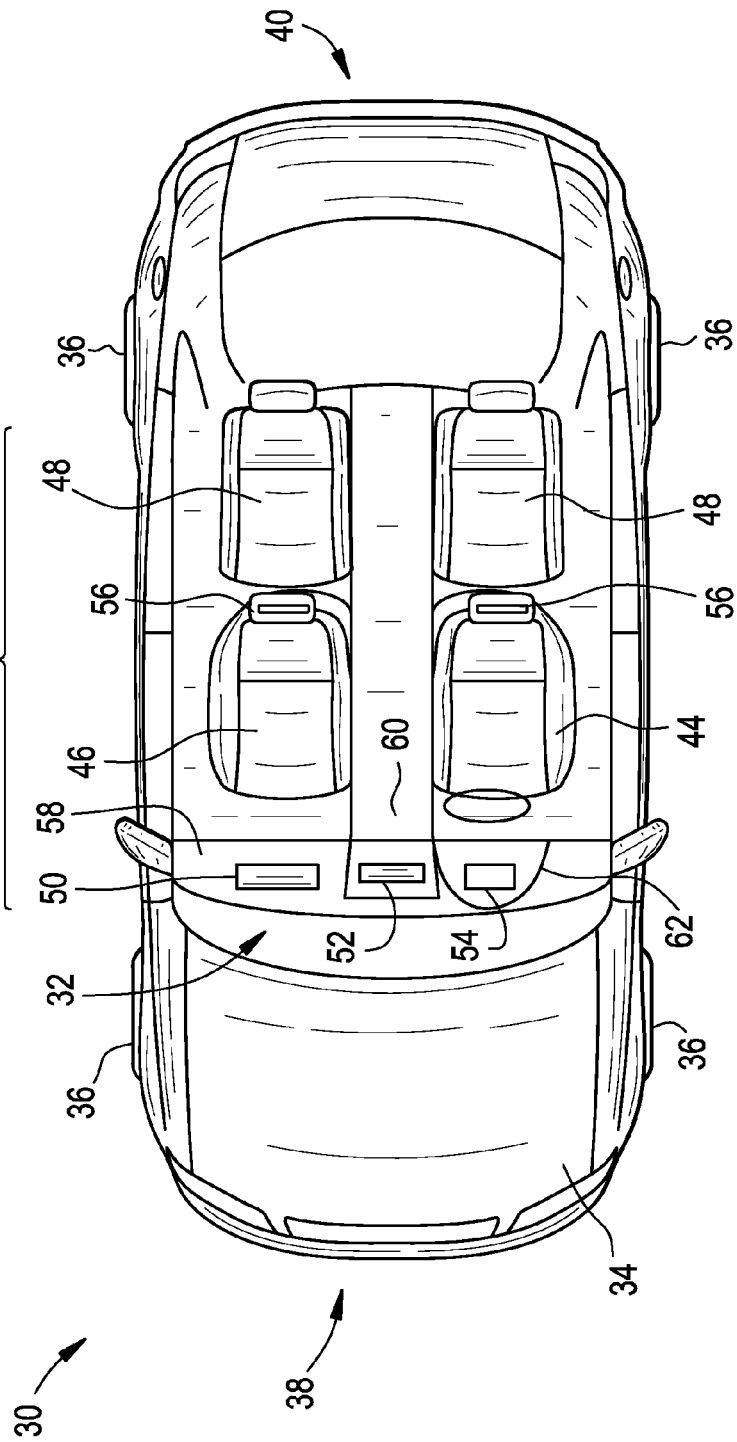
FIG. 2 is a plan view illustrating an embodiment of a vehicle with a multi-panel display system.

FIG. 2 is a plan view of a vehicle 30 having a vehicular multi-panel display system 32, according to one embodiment, incorporated therein. In the depicted embodiment, the vehicle 30 is an automobile and includes a chassis/body 34 and four wheels 36, each of which is rotationally coupled to the body 34 near a respective corner of the body 34. The body 34 has a front end 38, a back end 40, and a passenger compartment 42. Within the passenger compartment 42, a series of seats are arranged, including a driver's seat 44, a front passenger seat 46, and two rear passenger seats 48, along with a series of display devices 50-56. The display devices include a front passenger display device 50, a center console display device 52, a driver's display device 54, and two rear display devices 56.

However, it should be noted that in other embodiments, a different number and/or arrangement of display devices may be used. For example, a single rear display device may be used, which is laterally positioned between the rear passenger seats 48 (e.g., hanging from a ceiling of the passenger compartment 42).

The front passenger display device 50 is associated with (e.g., located directly in front of) the front passenger seat 46 and located on a dashboard 58 within the passenger compartment 42. The center console display device 52 is located on a center console 60, laterally positioned between the driver's seat 44 and the front passenger seat 46, as well as the driver's display device 54 and the front passenger display device 50 (i.e., the center console display device 52 is not associated with any of the seats 44-48). The driver's display device 54 is associated with the driver's seat 44 and is located on (or within) an instrument cluster 62 on the dashboard 58, positioned directly in front of the driver's seat 44, along with other various instruments, such as a speedometer, tachometer, etc. (not shown). The rear display devices 56 are each associated with one of the rear passenger seats 48 and located on, for example, the rear side of the headrests of the driver's seat 44 and the front passenger seat 46, respectively. Each of the display devices 50-56 is arranged such that is it visible to a user sitting in the seat with which it is associated.

Figure 3:
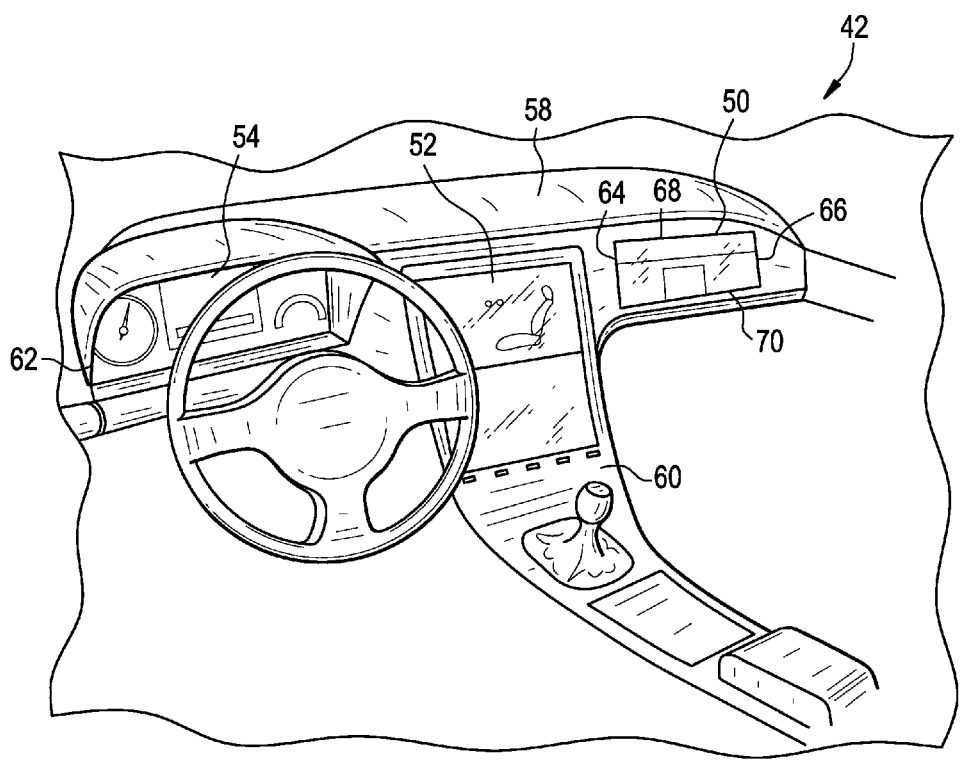
FIGS. 3-5 are perspective views illustrating an embodiment of a dashboard within a passenger compartment of the vehicle of FIG. 2.
Figure 4:
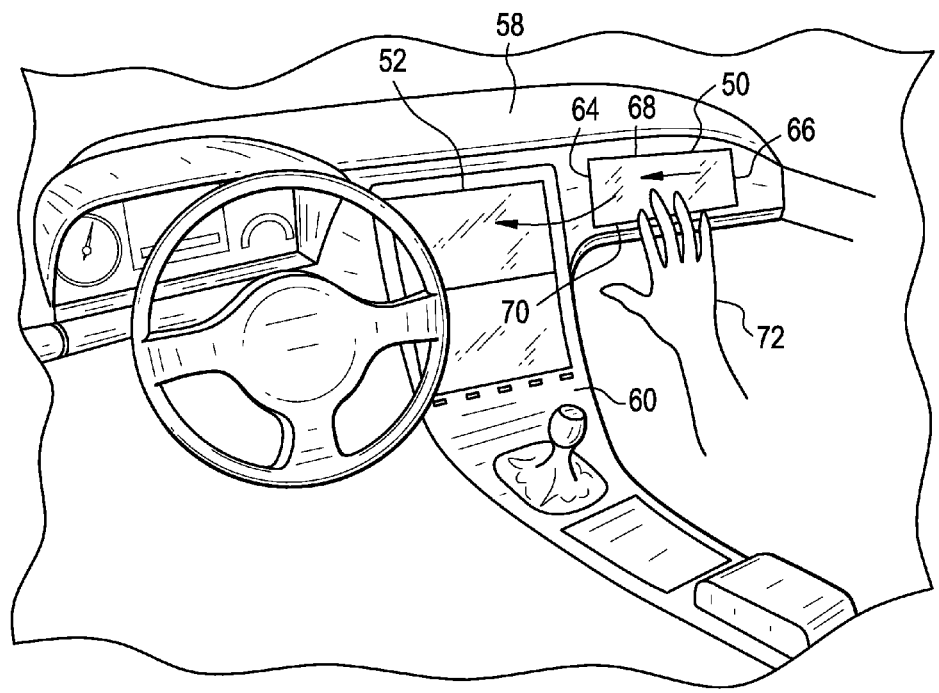
Figure 5:
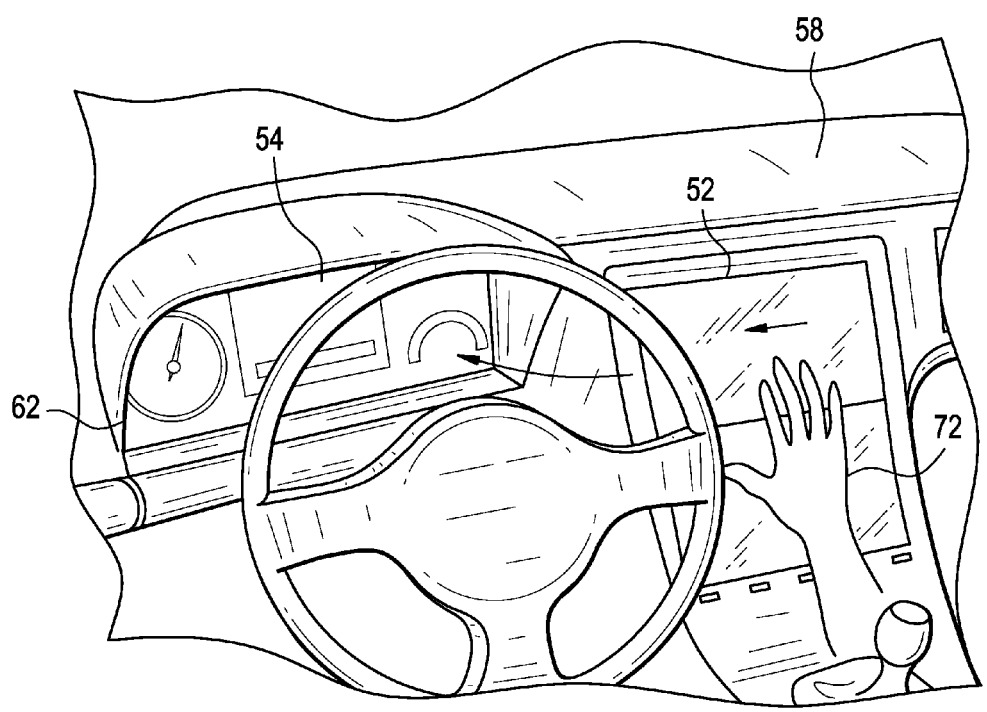

FIGS. 3-5 are perspective views from within the passenger compartment 42 of the dashboard 58, as well as the center console 60, illustrating the operation of the vehicular multi-panel display system 32 shown in FIG. 2. In one embodiment, the front passenger display device 50 is a touch screen panel, and thus has a user interface device incorporated therein (as described above). Additionally, the front passenger display device 50 includes first and second opposing lateral sides 64 and 66, a top side 68, and a bottom side 70. However, in other embodiments, a panel having one or more buttons or switches thereon may be mounted on the dashboard 58 near the front passenger display device 50, which may be used to control the transfer of content as described herein. It should also be noted that the controller 18 shown in FIG. 1 may be incorporated into, for example, the center console 60 and/or one or more of the display devices 50-56.

Referring specifically to FIG. 4, in operation, a user (e.g., a passenger sitting in the front passenger seat 46) enters various user input (i.e., first user input) into the user interface device (e.g., the sensor array) associated with the front passenger display device 50 to generate and/or modify content (and/or information) that is displayed on the front passenger display device 50. As shown, in a touch screen embodiment, the user input may be one or more gestures performed on the passenger display device 50 with a hand 72 of the user.

The user then enters predetermined user input (i.e., second user input) onto the front passenger display device 50 to cause the content to be sent to another of the display devices 52-56. In the example shown in FIG. 4, the user performs a "flick" or "swipe" gesture on the front passenger display device 50 towards the first lateral side 64 (and towards the center console display device 52). As a result, the content (e.g., GPS information) is sent to and displayed on the center console display device 52, while the content may also be removed from the passenger display device 50.

Referring now to FIG. 5, in one embodiment, the center console display device 52 may also be a touch screen panel (e.g., having the sensor array) such that a user (e.g., the passenger in the front passenger seat 46 or the driver in the driver's seat 44) may perform a similar operation to send the content from the center console display device 52 to the driver's display device 54. That is, the user performs another "flick" or "swipe" gesture on the center console display device 52, for example, towards a lateral side of the center console display device 52 nearest the driver's display device 54 (and/or towards the driver's display device 54). As a result, the driver may easily view the content while still operating the vehicle 30.

Referring again to FIG. 4, the vehicular display system 32 may also be configured so that the content may be sent to other display devices other than directly to the center console display device 52. For example, in one embodiment, if the user (i.e., in the front passenger seat 46) performs a "flick" gesture on the front passenger seat display device 50 towards the top side 68 of the front passenger seat display device 50, the content may be sent directly to the driver's display device 54, thus bypassing the center console display device 52.

As another example, if the user performs a "flick" gesture on the front passenger display device 50 towards the bottom side 70, the content may be sent to one or both of the rear passenger display devices 56 (FIG. 2), without first being displayed on the center console display device 52. In this way, content (e.g., a movie) may be prepared by a user sitting in the front passenger seat 46 (e.g., an adult), for passengers sitting in the rear passenger seats 48 (e.g., children).

Further, it should be understood that the vehicular display system 32 may be programmable so that the user and/or a technician may make changes to how the system reacts to particular user input (e.g., gestures). As a further example, still referring to FIG. 4, the system may be reprogrammed such that a "flick" gesture performed on the front passenger display device 50 towards the bottom side 70 sends the content to the rear passenger display device 56 on the headrest of the front passenger seat 46, while a "flick" gesture performed towards the second lateral side 66 sends the content to the rear passenger display device 56 on the headrest of the driver's seat 44.

Thus, the display system 32 allows for a user, other than the driver of the vehicle 30, to create, manage, and/or modify content transfer the content to all of the display devices 50-56 so that the content may easily be viewed by the other occupants, including the driver. As a result, the driver may be able to view content, and have the content modified, while minimizing any possible distractions.

Figure 6:
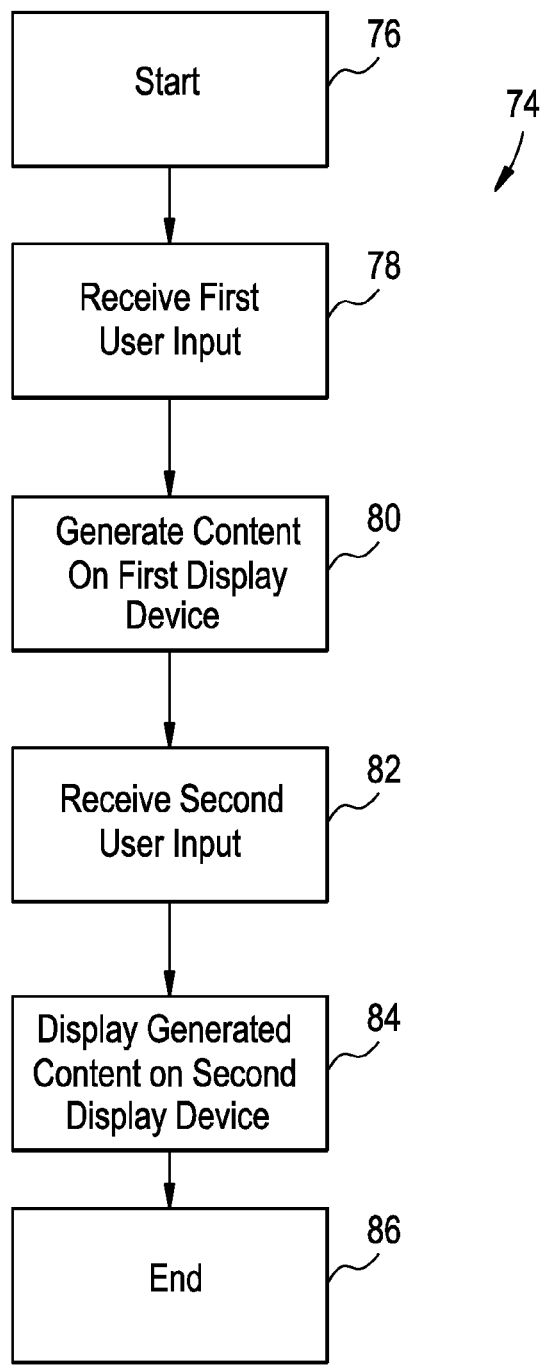
FIG. 6 is a flow chart illustrating an embodiment of a method for operating a multi-panel display system.

FIG. 6 is a flow chart of an embodiment of a method 74 for operating a multi-panel display system, such as a display system in a vehicle, according to one embodiment. The method 74 may be implemented by, for example, the displays systems 10 and 32 shown in FIGS. 1 and 2, respectively.

At block 76, the method 74 begins with, for example, the display system being powered on and/or generally used for viewing content, particularly with a first of two display devices. At block 78, when the user desires to have particular content displayed on the second display device, user input (i.e., first user input) is received by a user interface device in operable communication with the first display device.

At block 80, the desired content is generated on the first display device in response to the receiving of the user input. At block 82, predetermined use input (i.e., second user input) is received by the user interface device. At block 84, the content generated on the first display device is displayed on the second display device. At block 86, the method 74 ends and may be reinitiated by the user at block 76, or alternatively, at block 78.

Figure 7:
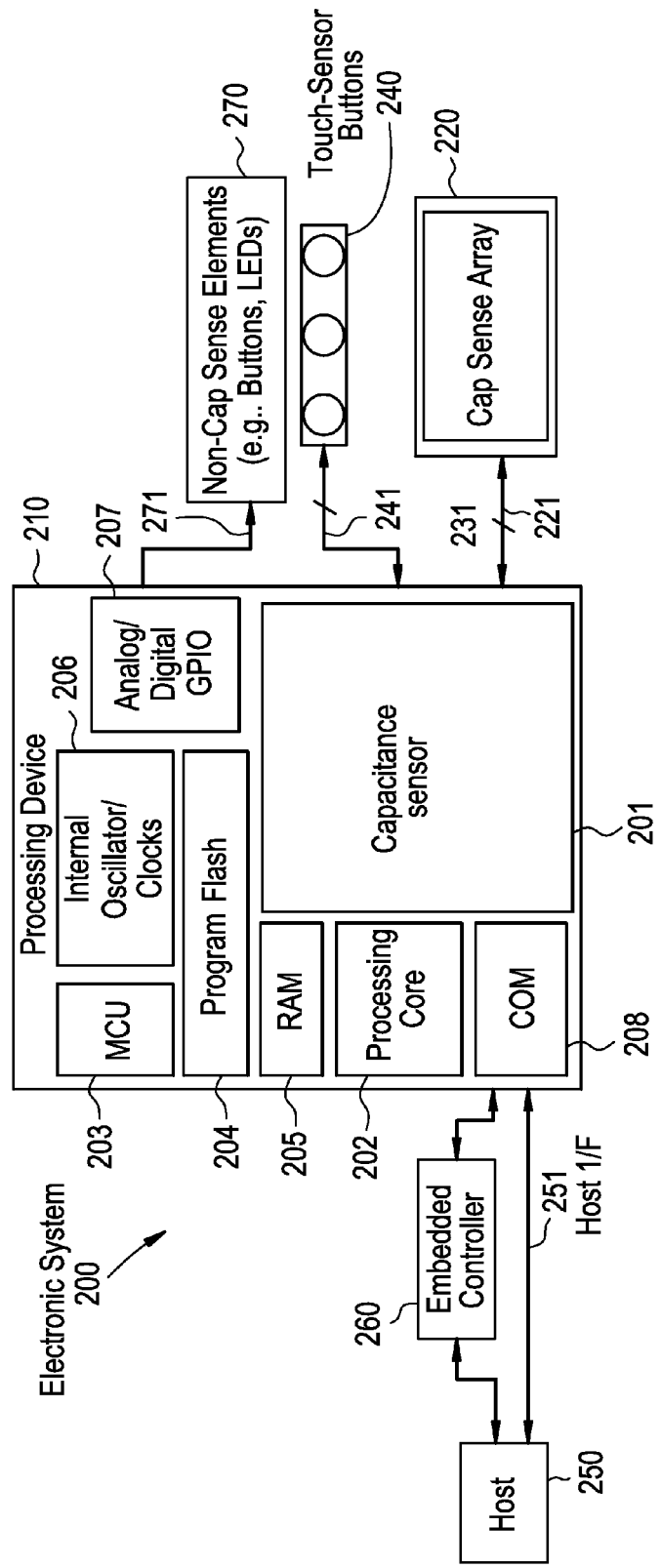
FIG. 7 is a schematic block diagram illustrating an embodiment of an electronic system.

FIG. 7 is a block diagram illustrating one embodiment of an electronic system 200 having a processing device for detecting a presence of a conductive object on a capacitive sense array 220 according to embodiments of the present invention. The electronic system 200 may be, for example, implemented with the first display device 12, the user input device 16, and/or the second display device 14 shown in FIG. 1, as well as any of the display devices shown in FIG. 2. The electronic system 200 includes a processing device 210, a capacitive sense array 220, touch-sense buttons 240, a host processor 250, an embedded controller 260, and non-capacitance sense elements 270.

The processing device 210 may include analog and/or digital general purpose input/output ("GPIO") ports 207. The GPIO ports 207 may be programmable and may be coupled to a Programmable Interconnect and Logic ("PIL"), which acts as an interconnect between GPIO ports 207 and a digital block array of the processing device 210 (not shown). The digital block array may be configured to implement a variety of digital logic circuits (e.g., DACs, digital filters, or digital control systems) using, in one embodiment, configurable user modules ("UMs"). The digital block array may be coupled to a system bus. The processing device 210 may also include memory, such as random access memory ("RAM") 205 and program flash 204. RAM 205 may be static RAM ("SRAM"), and program flash 204 may be a non-volatile storage, which may be used to store firmware (e.g., control algorithms executable by processing core 202 to implement operations described herein). The processing device 210 may also include a microcontroller unit ("MCU") 203 coupled to memory and the processing core 202.

The processing device 210 may also include an analog block array (not shown). The analog block array is also coupled to the system bus. The analog block array also may be configured to implement a variety of analog circuits (e.g., ADCs or analog filters) using, in one embodiment, configurable UMs. The analog block array may also be coupled to the GPIO ports 207.

As illustrated, a capacitance sensor 201 may be integrated into the processing device 210. The capacitance sensor 201 may include analog I/O for coupling to an external component, such as the capacitive sense array 220, the touch-sense buttons 240, and/or other devices. The capacitance sensor 201 and the processing device 210 are described in more detail below.

The embodiments described herein may be used in any capacitive sense array application. For example, the capacitive sense array 220 may be a touch screen, a touch-sense slider, or touch-sense buttons 240 (e.g., capacitance sense buttons). In one embodiment, these sense devices may include one or more capacitive sense elements. The operations described herein may include, but are not limited to, notebook pointer operations, lighting control (dimmer), volume control, graphic equalizer control, speed control, or other control operations requiring gradual or discrete adjustments. It should also be noted that these embodiments of capacitive sense implementations may be used in conjunction with non-capacitive sense elements 270, including but not limited to pick buttons, sliders (ex. display brightness and contrast), scroll-wheels, multi-media control (ex. volume, track advance, etc) handwriting recognition and numeric keypad operation.

In one embodiment, the capacitive sense array 220 is coupled to the processing device 210 via bus 221. The capacitive sense array 220 may include a one-dimensional sense array in one embodiment and a two-dimensional sense array in another embodiment. Alternatively, the capacitive sense array 220 may have more dimensions. Also, in one embodiment, the capacitive sense array 220 may be sliders, touchpads, touch screens or other sensing devices.

In another embodiment, the electronic system 200 includes touch-sense buttons 240 coupled to the processing device 210 via bus 241. The touch-sense buttons 240 may include a single-dimension or multi-dimension sense array. The single- or multi-dimension sense array may include multiple sense elements. For a touch-sense button, the sense elements may be coupled together to detect a presence of a conductive object over the entire surface of the sense device. Alternatively, the touch-sense buttons 240 may have a single sense element to detect the presence of the conductive object. In one embodiment, touch-sense buttons 240 may include a capacitive sense element. Capacitive sense elements may be used as non-contact sense elements. These sense elements, when protected by an insulating layer, offer resistance to severe environments.

The electronic system 200 may include any combination of one or more of the capacitive sense array 220 and/or touch-sense buttons 240. In another embodiment, the electronic system 200 may also include non-capacitance sense elements 270 coupled to the processing device 210 via bus 271. The non-capacitance sense elements 270 may include buttons, light emitting diodes ("LEDs"), and other user interface devices, such as a mouse, a keyboard, or other functional keys that do not require capacitance sensing. In one embodiment, busses 271, 241, 231, and 221 may be a single bus. Alternatively, these buses may be configured into any combination of one or more separate buses.

The processing device 210 may include internal oscillator/clocks 206 and a communication block ("COM") 208. The oscillator/clocks block 206 provides clock signals to one or more of the components of processing device 210. The communication block 208 may be used to communicate with an external component, such as a host processor 250, via host interface ("I/F") line 251. Alternatively, the processing device 210 may also be coupled to the embedded controller 260 to communicate with the external components, such as host processor 250. In one embodiment, the processing device 210 is configured to communicate with the embedded controller 260 or the host processor 250 to send and/or receive data.

The processing device 210 may reside on a common carrier substrate such as, for example, an integrated circuit ("IC") die substrate, a multi-chip module substrate, or the like. Alternatively, the components of processing device 210 may be one or more separate integrated circuits and/or discrete components. In one exemplary embodiment, processing device 210 may be the Programmable System on a Chip ("PSoC®") processing device, developed by Cypress Semiconductor Corporation, San Jose, Calif. Alternatively, processing device 210 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to a host, but may include a system that measures the capacitance on the sense device and sends the raw data to a host computer where it is analyzed by an application. In effect the processing that is done by processing device 210 may also be done in the host.

It is noted that the processing device 210 of FIG. 7 may measure capacitance using various techniques, such as self-capacitance sensing and mutual capacitance sensing. The self-capacitance sensing mode is also called single-electrode sensing mode, as each sensor element needs only one connection wire to the sensing circuit. For the self-capacitance sensing mode, touching the sensor element increases the sensor capacitance as added by the finger touch capacitance is added to the sensor capacitance. The mutual capacitance change is detected in the mutual capacitance-sensing mode. Each sensor element uses at least two electrodes: one is a transmitter (TX) electrode (also referred to herein as transmitter electrode) and the other is a receiver (RX) electrode. When a finger touches a sensor element or is in close proximity to the sensor element, the capacitive coupling between the receiver and the transmitter of the sensor element is decreased as the finger shunts part of the electric field to ground (e.g., chassis or earth).

The capacitance sensor 201 may be integrated into the IC of the processing device 210, or alternatively, in a separate IC. The capacitance sensor 201 may include relaxation oscillator (RO) circuitry, a sigma delta modulator (also referred to as CSD) circuitry, charge transfer circuitry, charge accumulation circuitry, or the like, for measuring capacitance as would be appreciated by one of ordinary skill in the art having the benefit of this disclosure. Alternatively, descriptions of the capacitance sensor 201 may be generated and compiled for incorporation into other integrated circuits. For example, behavioral level code describing capacitance sensor 201, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe the capacitance sensor 201.

It should be noted that the components of the electronic system 200 may include all the components described above. Alternatively, the electronic system 200 may include only some of the components described above.

In one embodiment, the electronic system 200 is used in a notebook computer. Alternatively, the electronic device may be used in other applications, such as a mobile handset, a personal data assistant ("PDA"), a keyboard, a television, a remote control, a monitor, a handheld multi-media device, a handheld video player, a handheld gaming device, or a control panel.

Although the foregoing examples have been described in some detail for purposes of clarity of understanding, the invention is not limited to the details provided. There are many alternative ways of implementing the invention. The disclosed examples are illustrative and not restrictive.

What is claimed is:

1. A vehicular multi-panel display system comprising:
   a first display device;
   a user interface device in operable communication with the first display device and configured to receive user input, wherein the user interface device comprises a sensor array coupled to the first display and configured to detect the presence an object proximate to the first display device such that the first display device and the user interface device jointly form a touch screen display device;
   a second display device in operable communication with the first display device; and
   at least one processing device in operable communication with the first display device, the user interface device, and the second display device, the at least one processing device being configured to:
   detect first user input received by the user interface device;
   generate content on the first display device in response to the detecting of the first user input;
   detect second user input received by the user interface device, wherein the second user input comprises a motion of the object across the touch screen display device; and
   display the generated content on the second display device in response to the detecting of the second user input.

2. The vehicular multi-panel display system of claim 1, wherein the first display device, the user interface device, and the second display device are positioned within a vehicular passenger compartment, wherein the vehicular passenger compartment comprises a plurality of passenger seats.

3. The vehicular multi-panel display system of claim 2, wherein one of the first display device and the second display device is associated with one of the plurality of passenger seats and the other of the first display device and the second display device is not associated with the one of the plurality of passenger seats.

4. The vehicular multi-panel display system of claim 2, wherein the second display device is substantially located to a side of the first display device within the vehicular passenger compartment, and wherein the motion of the object across the touch screen display device is substantially horizontal.

5. The vehicular multi-panel display system of claim 2, wherein the second display device is associated with a driver's seat within the vehicular passenger compartment.

6. The vehicular multi-panel display system of claim 2, wherein the first display device is associated with a front passenger seat within the vehicular passenger compartment and the second display device is associated with a rear passenger seat within the vehicular passenger compartment, and wherein the motion of the object across the touch screen display device is substantially vertical.

7. The vehicular multi-panel display system of claim 6, wherein the motion across the touch screen display device is substantially towards a bottom edge of the touch screen display device.

8. The vehicular multi-panel display system of claim 2, wherein the second display device is associated a center console substantially located between a driver's seat within the vehicular passenger compartment and a front passenger seat within the vehicular passenger compartment.

9. A computing network comprising:
   a first display device;
   a user input device coupled to the first display device, wherein the user input device is configured to detect motion of an object across the first display device;
   a first controller in operable communication with the first display device and the user input device, the first controller being configured to generate content on the first display device and transmit a signal representative of the content in response to user input received by the user input device, wherein the user input comprises motion of an object across the first display device;
   a second display device; and
   a second controller in operable communication with the second display device and the first controller, the second controller being configured to receive the signal representative of the content and generate the content on the second display device in response thereto.

10. The computing network of claim 9, wherein the user input device comprises an array of sensors overlapping the first display device.

11. The computing network of claim 9, wherein the first controller is further configured to generate a virtual user input device on the first display device in response to the user input.

12. A method for operating a vehicular multi-panel display system comprising:
   generating content on a first display device in a vehicular passenger compartment based on first user input received through a user interface device coupled to the first display device, wherein the user interface device comprises a sensor array configured to detect the presence of an object proximate to the first display device, and the first display device and the user interface device jointly form a touch screen display device;
   receiving second user input on the user interface device, wherein the second user input comprises a motion of the object relative to the touch screen display device; and
   displaying the generated content on a second display device in the vehicular passenger compartment in response to the receiving of the second user input on the user interface device.

13. The method of claim 12, wherein the motion of the object relative to the touch screen display device is in a direction indicative of a location of the second display device relative to the first display device.

* * * * *